US012807014B2

(12) United States Patent
Ive et al.

(10) Patent No.: US 12,807,014 B2
(45) Date of Patent: Nov. 24, 2026

(54) MOTOR VEHICLE WITH A CHARGE PORT DOOR PROVIDED WITH A SCREEN TO DISPLAY CHARGING INFORMATION

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James Mcgrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Stefano Galafassi, Modena (IT); Vito Conigliaro, Modena (IT)

(73) Assignee: FERRARI S.P.A., Modena (IT)

( * ) Notice: Subject to any disclaimer, the term of this patent is extended or adjusted under 35 U.S.C. 154(b) by 467 days.

(21) Appl. No.: 18/498,554

(22) Filed: Oct. 31, 2023

(65) Prior Publication Data

US 2024/0149716 A1 May 9, 2024

(30) Foreign Application Priority Data

Nov. 4, 2022 (IT) ........................ 102022000022761

(51) Int. Cl.
*B60L 53/16* (2019.01)
*B60L 50/60* (2019.01)
(Continued)

(52) U.S. Cl.
CPC ............... *B60L 53/16* (2019.02); *B60L 50/60* (2019.02); *B60L 58/12* (2019.02); *B60L 2250/16* (2013.01); *H02J 7/82* (2026.01)

(58) Field of Classification Search
CPC .......... B60L 50/60; B60L 53/16; B60L 58/12; B60L 2250/16; Y02T 10/70; Y02T 10/7072; Y02T 90/14
See application file for complete search history.

(56) References Cited

U.S. PATENT DOCUMENTS

| | | | | |
|---|---|---|---|---|
| 5,757,595 | A * | 5/1998 | Ozawa | B60L 58/12 340/455 |
| 10,189,361 | B2 * | 1/2019 | Yamazaki | B60L 58/12 |

(Continued)

FOREIGN PATENT DOCUMENTS

| | | | |
|---|---|---|---|
| DE | 102012009018 | A1 | 11/2013 |
| DE | 102019215862 | A1 | 4/2021 |
| FR | 3052113 | A1 | 12/2017 |

OTHER PUBLICATIONS

Italian Search Report for Application No. 202200022761; Filing Date: Nov. 4, 2022; Date of Mailing: Mar. 28, 2023; 6 pages.

*Primary Examiner* — Tinh T Dang
(74) *Attorney, Agent, or Firm* — CANTOR COLBURN LLP

(57) ABSTRACT

A motor vehicle includes a rechargeable power source, a body portion, a charging compartment on the body portion, a charge port arranged inside the charging compartment and connected to the rechargeable power source, a door having a first and a second face opposite one another according to the direction of a thickness of the door, the door being
(Continued)

coupled to the body portion in a movable manner between a closing position, in which the door closes the charging compartment with the first face facing the charging compartment, and an opening position, in which the charging compartment can be accessed from the outside, so that an outer charging source can be connected to the charge port in order to enable a charging process of the rechargeable power source, and a screen to display one or more items of information relating to the charging process, wherein the screen is placed in a position so as to be covered by the door in the closing position.

14 Claims, 5 Drawing Sheets

(51) Int. Cl.

*B60L 58/12* (2019.01)
*H02J 7/82* (2026.01)

(56) References Cited

U.S. PATENT DOCUMENTS

2011/0043355 A1 2/2011 Chander et al.
2017/0267117 A1 9/2017 Grider et al.

* cited by examiner

MOTOR VEHICLE WITH A CHARGE PORT DOOR PROVIDED WITH A SCREEN TO DISPLAY CHARGING INFORMATION

CROSS-REFERENCE TO RELATED APPLICATIONS

This patent application claims priority from Italian patent application no. 102022000022761 filed on Nov. 4, 2022, the entire disclosure of which is incorporated herein by reference.

TECHNICAL FIELD

The invention relates to a motor vehicle, in particular comprising at least one electric powertrain.

PRIOR ART

Some motor vehicles provided with an electric powertrain, i.e. hybrid or electric vehicles, include a rechargeable power source, such as a battery, and a charge port to receive electrical power from an outer source, for example an EV charging station.

Said motor vehicle are commonly known as plug-in hybrid or electric vehicles.

The charge port is normally located inside a charging compartment obtained on the body and covered by a door that is movable between the position in which is actually covers the charging compartment and a position in which it makes the latter accessible to users.

Generally speaking, users need to be provided with as much information as possible concerning the charging of the power source in the most immediate and simple way possible.

An object of the invention is to fulfil said need.

DESCRIPTION OF THE INVENTION

Said object is reached by a motor vehicle as defined in claim 1.

The dependent claims define special embodiments of the invention.

BRIEF DESCRIPTION OF THE DRAWINGS

Hereinafter, an embodiment of the invention will be described, in order to allow the latter to be better understood, by way of non-limiting example and with reference to the accompanying drawings, wherein.

EMBODIMENTS OF THE INVENTION

Figure 1:
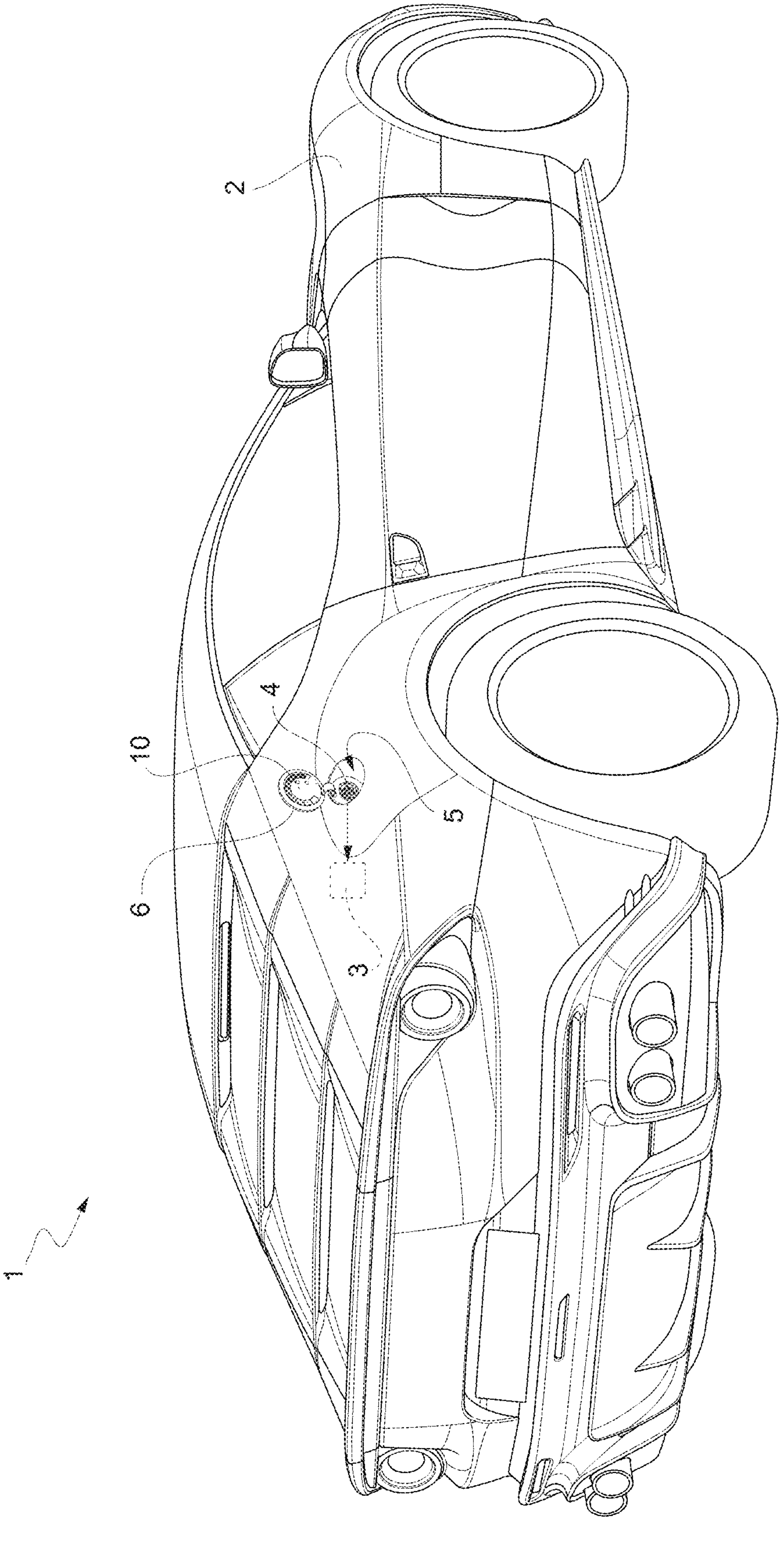
FIG. 1 is a perspective view of a motor vehicle according to the invention.

In FIG. 1, reference number 1 is used to indicate, as a whole, a motor vehicle.

Like all motor vehicles, the motor vehicle 1 comprises a body 2 including the frame and the shell of the motor vehicle 1.

The motor vehicle 1 has at least one known electric powertrain, which is not shown herein. Therefore, the motor vehicle 1 is of the hybrid or electric kind.

Furthermore, the motor vehicle 1 comprises a rechargeable power source 3, for example one or more batteries interconnected with one another.

In order to charge the source 3, the motor vehicle 1 comprises a suitable charge port 4 connected to the source 3.

The port 4 is located in a corresponding charging compartment 5 obtained on a portion of the body 2, namely having outlines defined by said portion.

The motor vehicle 1 preferably comprises a known lighting device, which is not shown herein, inside the charging compartment 5 to light the charging compartment 5.

The port 4 can be connected to known outer charging sources, which are not shown herein, such as an EV charging station, a home power network, another battery, etc., for example by means of wired connections.

The connection of the port 4 to an outer source allows the source 3 to be charged. For example, without losing generality, the charging process could optionally directly start thanks to the connection, through the creation of a difference of potential between the source 3 and the outer source. Hence, the mere connection of the port 4 to the source can be sufficient to start the charging process.

In the embodiment of FIG. 1, the charging compartment 5 is arranged on a rear portion of the body 2, even though this is a mere non-necessary example. The charging compartment 5 could even be potentially located inside the motor vehicle 1, without losing generality.

The motor vehicle 1 comprises a door 6 to selectively cover the charging compartment 5.

The door 6 has a thickness and at least two faces 7, 8 (FIG. 2) opposite one another according to the direction of the thickness.

The door 6 is coupled to the portion of the body 2 in the area of the charging compartment 5 in a movable manner, so as to move between an opening position and a closing position.

In particular, the door 6 is hinged to the portion of the body 2 around a hinge axis H, whereby the door 6 can rotate between the closing position and the opening position.

In the closing position, the door 6 closes or covers the charging compartment 5 with the face 7 facing the charging compartment 5 and, in particular, the port 4, whereas the face 8 faces the outside of the motor vehicle 1.

More in detail, in the closing position, the door 6 or, more in particular, the face 8 is flush with the portion of the body 2.

On the other side, specifically, the face 8 faces the portion of the body 2 when the door 6 is in the opening position.

In the opening position, the charging compartment 5 is accessible from the outside, in particular from the outside of the motor vehicle 1. In this way, the port 4 can be connected to the outer source, so that the source 3 can be subjected to a charging process.

In the embodiment of FIG. 1, showing the door 6 in the opening position, the face 7 faces the outside of the motor vehicle 1.

The motor vehicle 1 preferably comprises an actuator assembly 9, for example including an electric motor, configured to automatically move the door 6, for example in response to commands given by a user.

More preferably, the motor vehicle 1 comprises an automatic locking device **9*b* configured to lock and unlock the door 6 in the closing position. The automatic device 9*b* is coordinated with the actuator assembly 9, in particular to unlock the door 6 when the actuator assembly 9 opens the door 6 from the closing position and/or to lock the door 6 when the actuator assembly 9 moves the door 6** to the closing position.

The automatic locking device 9*b* can further be configured to ensure the precision of the closing position when the door 6 is locked.

Furthermore, the automatic locking device 9*b* can further be configured to allow the door 6 to be manually opened from the closed position.

Moreover, the automatic locking device 9*b* can be configured to lock or unlock the door 6 in the closing position in response to commands given by the user.

The commands to move the door 6 or to lock/unlock the door 6 can be provided by the user by means of one or several known devices, such as physical or virtual keys, levers, voice detectors, touch-sensitive elements and the like, for example located inside or outside the motor vehicle 1 or even located in remote devices, such as mobile phones. Therefore, this disclosure will not provide further specific details on the means or devices to be used to provide the actuator assembly 9 or the automatic locking device 9*b* with commands.

According to the invention, the motor vehicle 1 comprises a screen 10 to display one or more items of information relating to the charging process. In particular, the information displayed on the screen 10 is continuously updated during the charging process.

The screen 10 is arranged, for example, on the face 7, in particular in a fixed position relative to the door 6, so as to be visible to the user when the door 6 is in the opening position. Indeed, with the door 6 in the opening position, the screen 10 faces the user or, in this specific case, the outside of the motor vehicle 1. Besides the face 7, the door 6 preferably has a further face 7*a* opposite the face 8 and, hence, facing the charging compartment 5 when the door 6 is in the closed position.

The face 7*a* is arranged, relative to the face 7, so as to form a closed ring around the face 7.

Furthermore, the face 7*a* projects or protrudes relative to the face 7, in particular according to the direction of the thickness of the door 6; in other words, the face 7 is recessed relative to the face 7*a*, in particular according to the direction of the thickness of the door 6, thus forming a housing for the screen 10.

Figure 2:
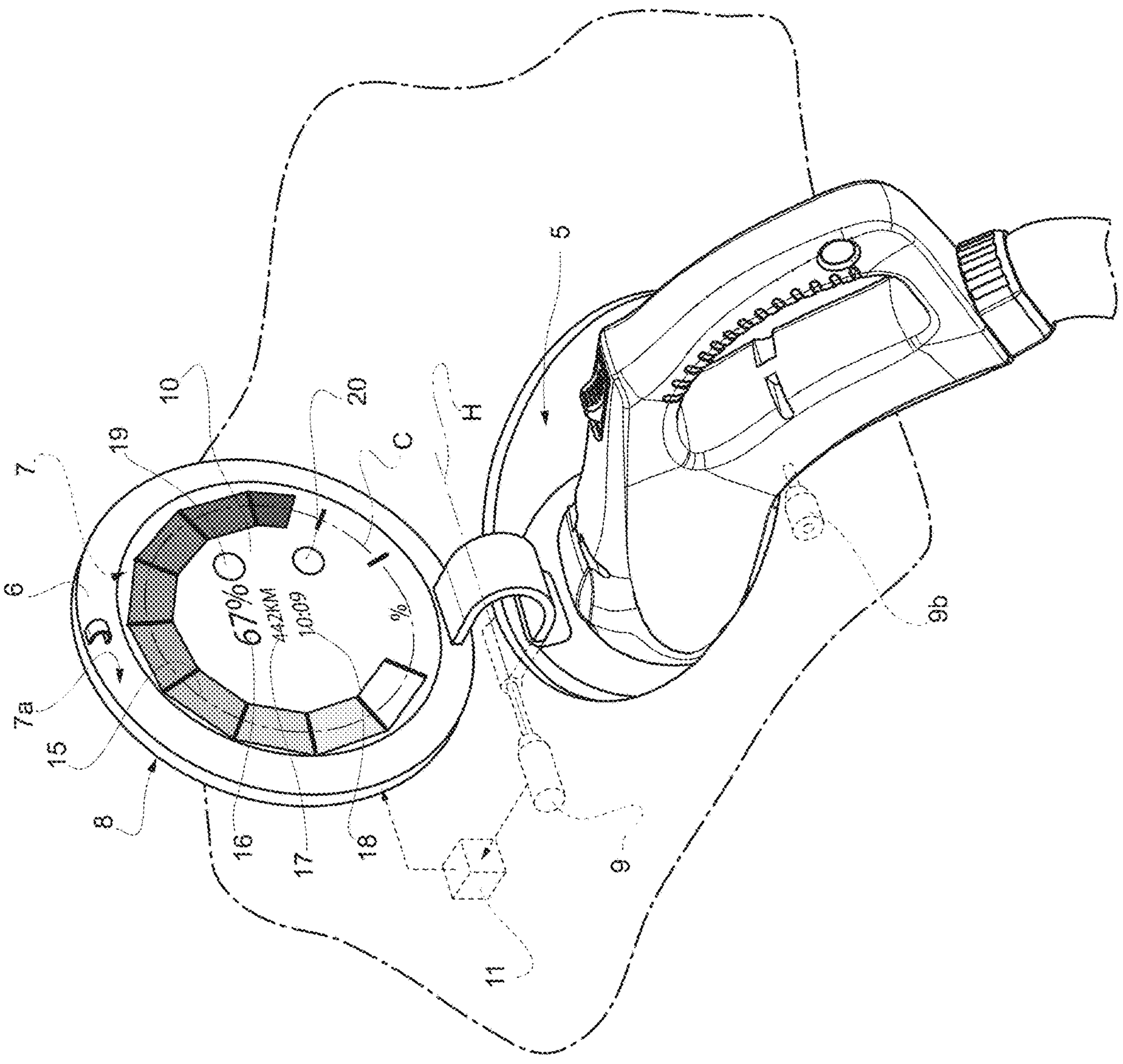
FIG. 2 is a perspective view, on a larger scale, of a detail of the motor vehicle in the area of a charge port thereof.

The screen 10 is built-in in said housing and, in particular, entirely covers the face 7. Therefore, the user only sees the face 7*a*, but does not see the face 7, as shown in FIGS. 1, 2.

The face 7 preferably is flat and, more preferably, orthogonal to the direction of the thickness of the door 6.

Furthermore, independently, the screen 10 also is preferably flat and, more preferably, parallel to the face 7.

The face 7*a* is part of an annular frame for the screen 10.

In the embodiment of FIGS. 1 and 2, the screen 6 has a circular or elliptical shape, namely, more in general, a roundish shape.

Alternatively or in addition, the screen 10 can have a circular or elliptical shape, namely, more in general, a roundish shape.

The screen 10 could be flush with the face 7*a* or could be arranged in a recessed position relative to the face 7*a*, as shown in FIG. 2, according to the direction of the thickness of the door 6.

Figure 3:
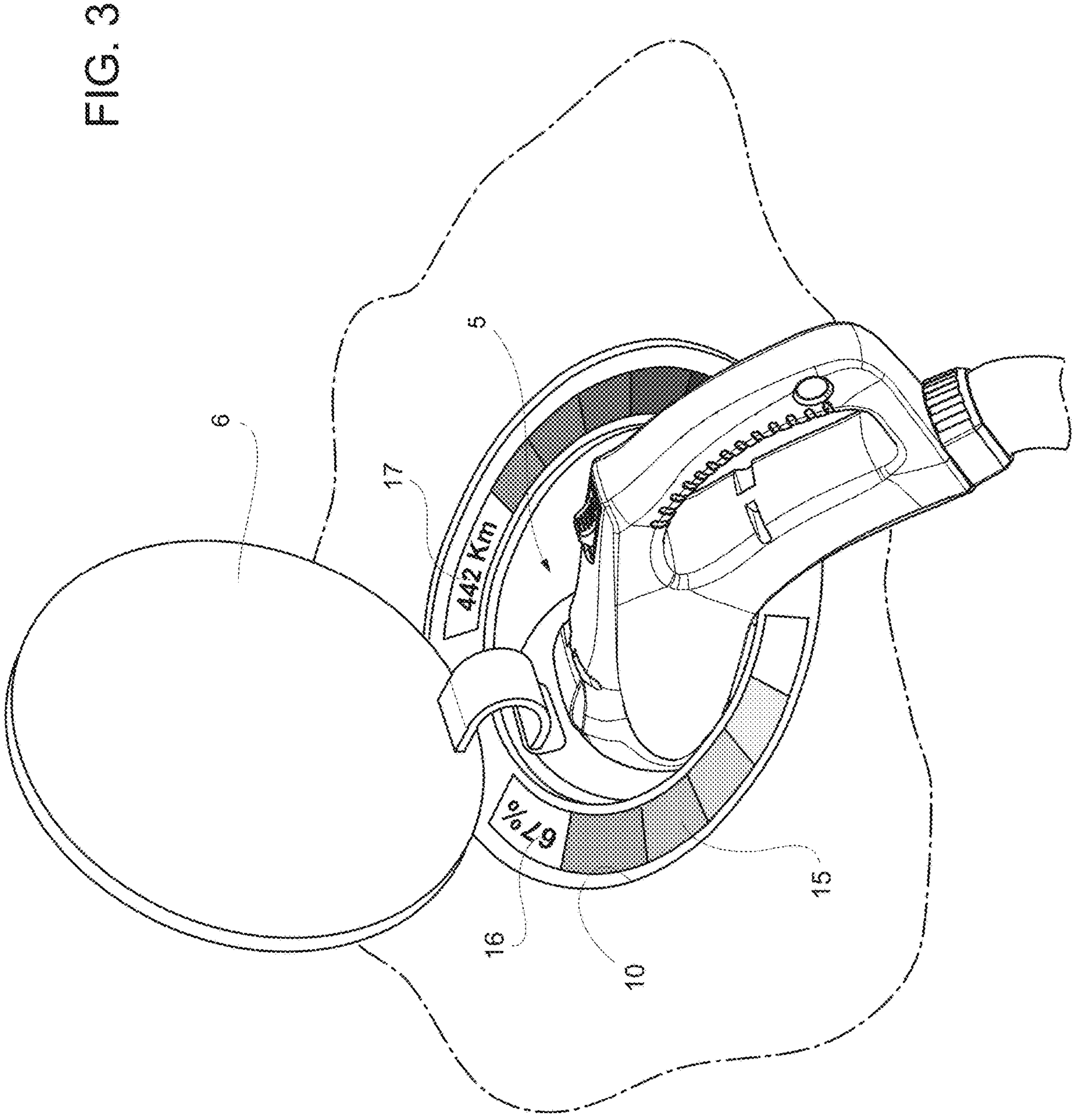
FIGS. 3, 4 and 5 shows respective variants of the detail of FIG. 2.
Figure 4:
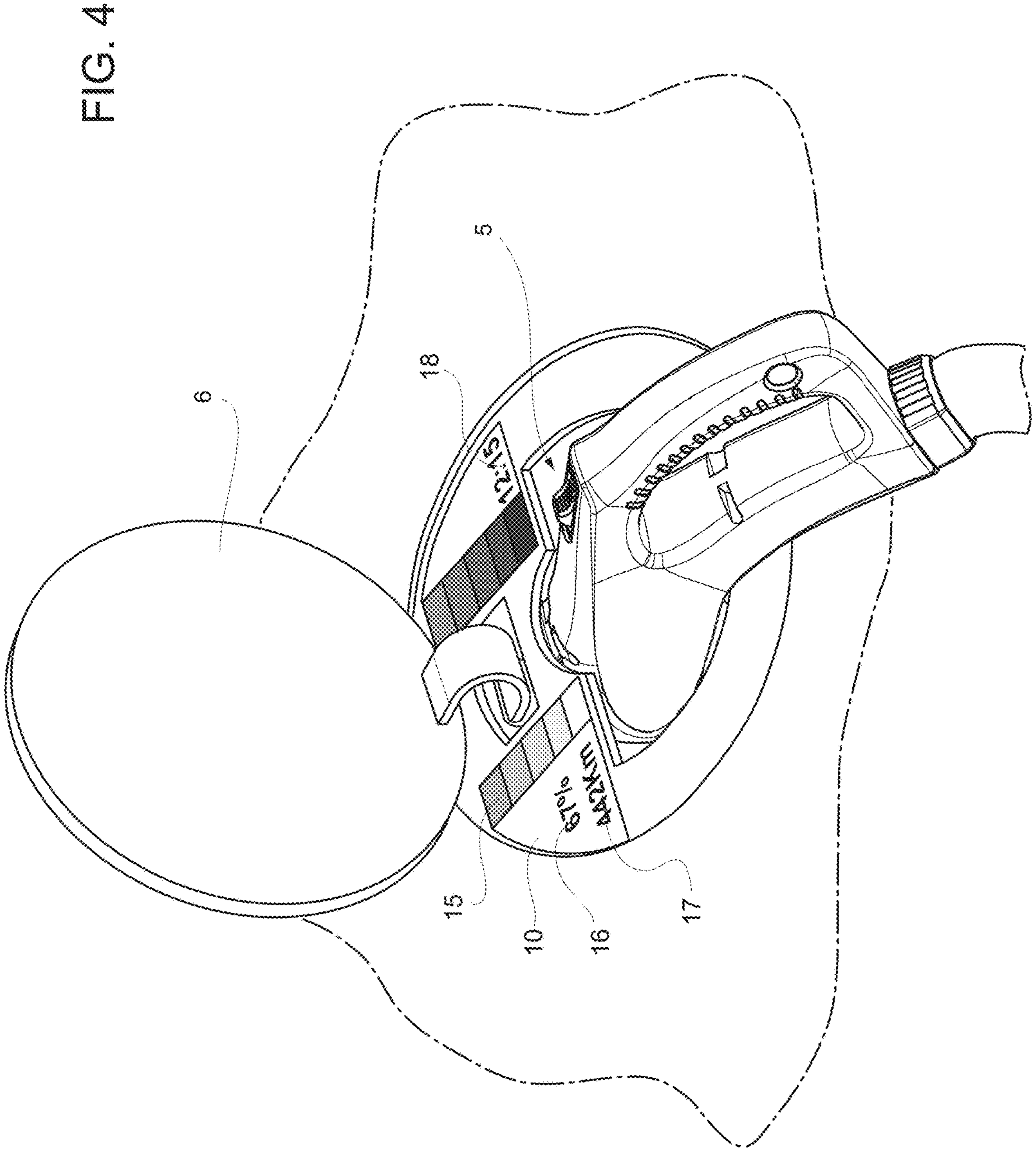

The arrangement of the screen 10 in FIG. 2 is not strictly necessary. Other possible examples of arrangements of the screen 10 are shown in the variants of FIGS. 3 and 4. In FIGS. 3, 4, the screen 10 is arranged on a front surface arranged on the outside of the compartment 5 so as to surround the compartment 5. In particular, the screen 10 is fixed relative to the compartment 5. Herein, the term "front" means facing the user looking at the compartment 5. In FIG. 3, the screen 10 circularly extends around the compartment 5. In FIG. 4, the screen 10 only occupies a portion of the front surface.

Figure 5:
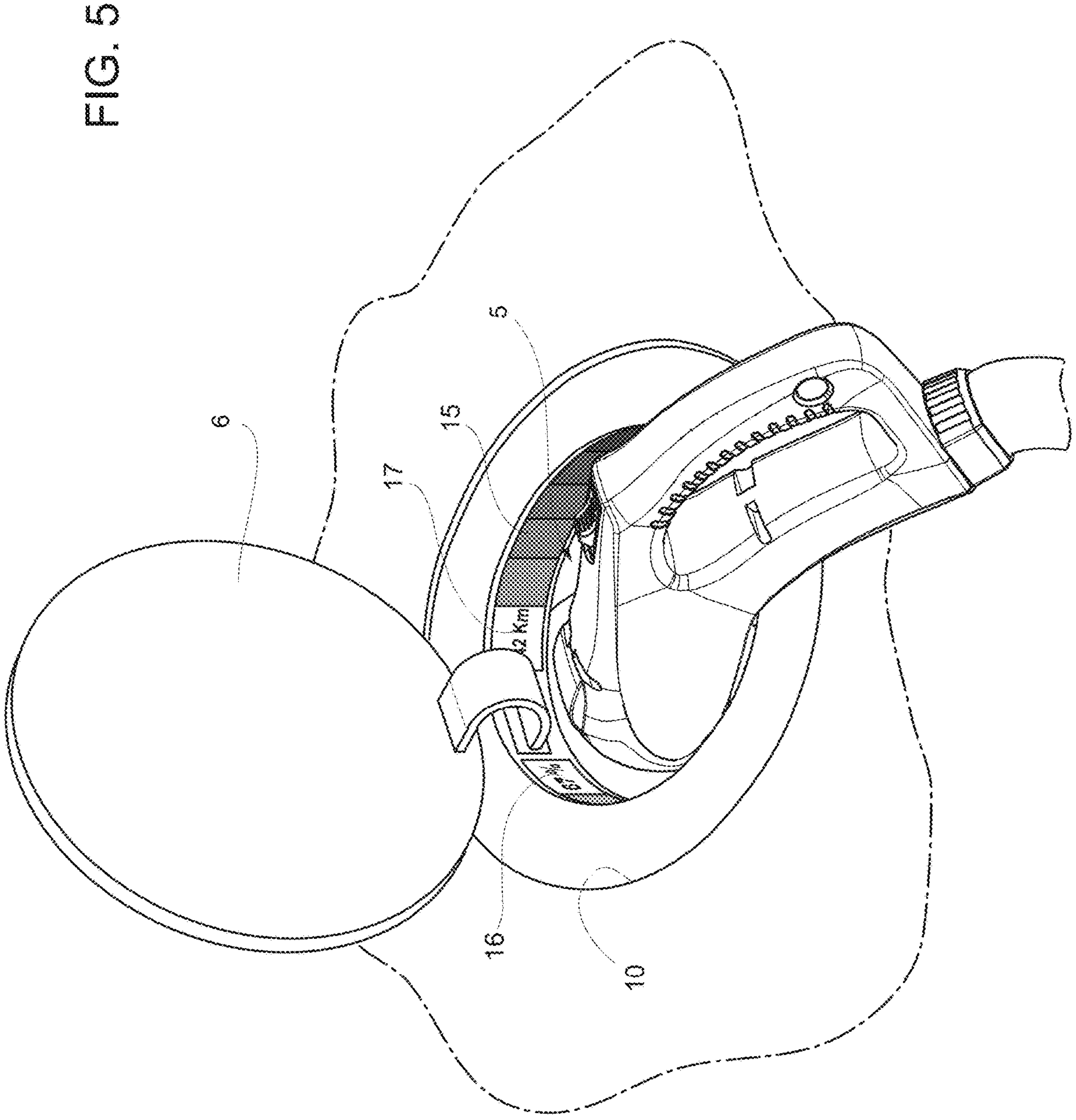

Another possible example of arrangement of the screen 10 is the one shown in the variant of FIG. 5. In FIG. 5, the screen 10 is arranged on a cylindrical or annular side surface, which laterally delimits the compartment 5. The screen 10 can extend along the entire annular surface or along a portion thereof.

According to an example which is not shown herein, the screen 10 can be arranged on a front surface arranged on the inside of the compartment 5. More specifically, said front surface belongs to a bottom of the compartment 5.

In these last two examples, the screen 10 is fixed relative to the compartment 5, instead of the door 6.

In general, the screen 10 is arranged so as to be covered by the door 6 in the closing position.

The screen 10 can be in an on or off condition; in other words, the screen 10 can be turned on or turned off. The screen 10 is conveniently provided with an anti-reflection function.

The screen 10 preferably comprises a twilight sensor assembly configured to detect a change in the brightness of the surrounding environment and to change the backlight of the screen 10 depending on the detected change.

When the screen 10 is on, it shows, in a visible manner, namely in a lit state, one or more indicators 15, 16, 17, 18 displaying respective items of information, for example indicative of the state of charge of the source 3 or concerning the charging process.

When the screen 10 is off, none of the indicators 15, 16, 17, 18 is visible or lit.

Each one of the indicators 15, 16, 17, 18 is part of the screen 10. In particular, when the screen 10 is on, all indicators 15, 16, 17, 18 could be visible, even though this is not necessary. As a matter of fact, according to possible variants, each one of the indicators 15, 16, 17, 18 could selectively be singularly turned on or off, i.e. made visible or non-visible, respectively, namely—in other words—lit or non-lit, provided that at least one of the indicators 15, 16, 17, 18 remains on. Otherwise, if none of the indicators 15, 16, 17, 18 is on, the screen 10 is off.

The motor vehicle 1 advantageously comprises a control device 11 configured to control the screen 10, for example to turn on or off, one by one or in a group, the indicators 15, 16, 17, 18 or to control the anti-reflection function of the screen 10.

The control device 11 can be arranged in the area of the door 6 or in the area of the charging compartment 5 or in a position far from them. Placing the control device 11 far from the door 6 allows for a greater compactness of the door 6. On the other hand, placing the control device 11 in the area of the door 6, namely in a dedicated compartment obtained in the door 6, leads to a simplification of the wiring.

In particular, the control device 11 or another control device can be configured to turn the screen 10 on in response to an arrangement of the door 6 in the opening position.

For example, the control device 11 is synchronized with the actuator assembly 9.

In particular, the control device 11 is configured to detect when the actuator assembly 9 moves the door 6 to the opening position and to turn the screen 10 on when this happens.

The detection can take place in different manners, for example by means of a suitable position sensor for the door 6 or depending on a control signal of the actuator assembly 9, for instance emitted by the control device 11.

In the embodiment of FIG. 2, the screen 10 specifically displays the four indicators 15, 16, 17, 18. In particular, each one of the indicators 15, 16, 17, 18 is continuously updated during the charging process.

Each one of the indicators 15, 16, 17, 18 should be considered as independent from the others, so that each one of them could be absent according to potential variants that are not shown herein. Furthermore, the fact that there are four of them merely is a non-limiting example, which means that the screen 10 could have a different number of indicators.

Any, some or all of the indicators 15, 16, 17, 18 preferably are part of respective re-configurable graphic areas of the screen 10. In particular, each re-configurable graphic area can be controlled by the control device 11 so that the corresponding indicator 15, 16, 17, 18 displays a specific type of information among several possible types of information that can be displayed by it. More in particular, the types of information can be different from on another because of the matter of the displayed information and/or because of the graphic displaying format.

The control device 11 is configured to re-configure, namely control, each re-configurable graphic area or the corresponding indicator 15, 16, 17, 18 in response to a relative command of the user, for example that can be provided by means of a physical key in the area of the door 6 or by means of a touch-sensitive portion of the screen 10 defining a virtual key.

The control device 11 preferably is also configured to adjust the brightness of the screen 10 or to turn the screen 10 off, for example even during the charging process, in particular in response to a relative command of the user, for example that can be provided by means of a physical key in the area of the door 6 or by means of a touch-sensitive portion of the screen 10 defining a virtual key.

The indicator 15 is adapted to display a state of charge of the source 3, in particular the current state of charge of the source 3.

In particular, the indicator 15 comprises a graduated scale along a circular direction C. More in particular, the indicator 15 is arranged on a peripheral area of the screen 10.

The graduated scale preferably extends only along a portion of circumference, even though this is not necessary; the graduated scale could have extended along the circular direction C so as to form a closed annular surface.

The state of charge is preferably expressed in percentage terms on the graduated scale.

Each one of the additional indicators 16, 17, 18 is conveniently arranged within the circular direction C.

The indicator 16, for example, is adapted, like the indicator 15, to display the state of charge of the source 3. Specifically, the indicator 16 displays numbers or text. More specifically, the indicator 16 is configured to express the state of charge by means of a number, for instance expressed as a percentage.

The indicator 17 is adapted to display a quantity indicative of a range, in particular a current range of the source 3, for example by means of a string or a number, more precisely indicating the distance that can still be covered by the motor vehicle 1, for example expressed in kilometres.

The indicator 18 is adapted to display a time, for example expressed by means of a string or a number.

For instance, the time can be the estimated time left to complete the charging process or a time elapsed since the beginning of the charging process.

Alternatively, the two times mentioned above could simultaneously be displayed by means of two corresponding distinct or coinciding indicators. Indeed, these last indicators could even conceptually overlap one another and turn on in an alternated manner based on a predetermined criterion, for example alternating at the end of a displaying time or based on specific commands of the user.

As mentioned above, each one of the indicators 15, 16, 17, 18, namely the corresponding re-configurable graphic area, can be reconfigured by the control device 11 so as to display a different type of information. By way of example, the indicator 16 will be taken into account, even though the same concepts also apply to each one of the other indicators 15, 17, 18. The control device 11 can re-configure the indicator 16 so that it displays the charging energy, for example expressed in KWh, instead of displaying the state of charge of the source 3 as described above. Alternatively, the indicator 16 can be re-configured to display any one of the items of information described above, in particular the ones described for the other indicators 15, 17, 18.

Similarly, generally speaking, the charging energy can be displayed by any one of the indicators 15, 16, 17, 18.

The screen 10 optionally comprises a touch-sensitive portion suited to allow the user to "swipe". In other words, the touch-sensitive portion is configured to detect the swiping of a physical element, for example a user's finger or a pencil, across itself and to emit a corresponding signal indicative of the detected movement. Herein, the control device 11 is configured to change the graphics of the screen 10 and to re-configure some or all of the indicators 15, 16, 17, 18 depending on the signal emitted by the touch-sensitive portion. In this case, the meaning of the term "re-configure" is similar to the one discussed above with reference to the displaying of a specific type of information among several possible items of information that can be displayed. In particular, the "swipe" can be considered as an alternative to the use of virtual keys to control the device 11.

Furthermore, the screen 10 preferably comprises a touch-sensitive portion defining a virtual key 19 configured to cause a start of the charging process.

Basically, even if the port 4 is connected to the outer source, the charging process does not take place until the user causes the start by pressing the virtual key 19 on the screen 10.

Alternatively or in addition, the screen 10 further comprises another touch-sensitive portion defining another virtual key 20 configured to cause an interruption of the charging process.

Basically, even if the port 4 is connected to the outer source, the charging process is interrupted when the user presses the virtual key 20 on the screen 10.

In this context, the key 19 could be considered as configured to continue or resume the charging process after an interruption caused by the key 20.

Furthermore, the key 19 could even be configured for the sole last function, i.e. to continue the charging process after an interruption. In other words, the initial start of the charging process would be performed, in this case, in an automatic manner by connecting the port 4 to the outer source. After that, the process can be interrupted by the key 20 and then resumed by the key 19 until the end of the process, for example coinciding with the complete charge of the source 3.

Alternatively or in addition, the key 19 could be configured to allow the user to set a scheduled start, for example at a selected time. For example, the key 19 could permit the entering of the selected time in any format, for instance in the form of number.

Generally speaking, each one of the keys 19, 20 could be replaced by a corresponding physical key or by voice command receivers or, more in general, by any kind of control device that can be operated by the user.

Owing to the above, the advantages of the motor vehicle 1 according to the invention are evident.

In particular, the screen 10 allows the user to receive important information for the charging process of the source 3 in an immediate and extremely simple manner.

Furthermore, the arrangement of each one of the indicators 15, 16, 17, 18 increases the compactness of the screen 10 and of the door 6 as well as the clearness of the information displayed to the user.

The automatic turning on of the screen 10 when the door 6 is moved to the opening position is ideal in terms of energy saving and user-friendliness.

Furthermore, the keys 19, 20 permit a simple, immediate and effective management of the charging process. Since the keys 19, 20 are integrated in the screen 10, the latter and the door 6 are particularly compact.

In addition, the arrangement of the screen 10 on the face 7 ideally allows the user to immediately see the screen 10 when the door 6 is moved to the opening position.

Finally, the motor vehicle 1 according to the invention can be subjected to changes and variants, which, though, do not go beyond the scope of protection set forth in the appended claims.

For example, the technology on which the operation of the screen 10 is based, for example LED, OLED or the like, can be chosen based on specific needs of the buyer of the motor vehicle 1.

The invention claimed is:

1. A motor vehicle (1) comprising
- a rechargeable power source (3),
- a body portion (2),
- a charging compartment (5) on the body portion (2),
- a charge port (4) arranged inside the charging compartment (5) and connected to the rechargeable power source (3),
- a door (6) having a first and a second face (7, 8) opposite one another according to the direction of a thickness of the door (6), the door (6) being coupled to the body portion (2) in a movable manner between a closing position, in which the door (6) closes the charging compartment (5) with the first face (7) facing the charging compartment (5), and an opening position, in which the charging compartment (5) can be accessed from the outside, so that an outer charging source can be connected to the charge port (4) in order to enable a charging process of the rechargeable power source (3), and
- a screen (10) to display one or more items of information relating to the charging process,
- wherein the screen (10) is placed in a position so as to be covered by the door (6) in the closing position;
- wherein the screen (10) comprises a second touch-sensitive portion defining a second virtual key (20) configured to cause an interruption of the charging process.

2. The motor vehicle according to claim 1, wherein the screen (10) is arranged on the first face (7) in a manner to be visible when the door (6) is in the opening position.

3. The motor vehicle according to claim 2, wherein the door (6) has a third face (7*a*) forming a closed ring around the first face (7), the first face (7) being recessed relative to the third face (7*a*) so as to form a housing for the screen (10), the screen (10) being built-in in the housing so as to entirely cover the first face (7).

4. The motor vehicle according to claim 1, wherein the door (6) and/or the screen (10) have a circular or elliptical shape.

5. The motor vehicle according to claim 1, wherein the door (6) is hinged to the body portion (2) around a hinge axis (H).

6. The motor vehicle according to claim 1, wherein the screen (10) comprises a first indicator (15, 16) adapted to display a state of charge of the rechargeable power source (3).

7. The motor vehicle according to claim 6, wherein the first indicator (15) comprises a graduated scale along a circular direction (C).

8. The motor vehicle according to claim 7, wherein the screen (10) comprises at least one further additional indicator (16, 17, 18) within the circular direction (C).

9. The motor vehicle according to claim 1, wherein the screen (10) comprises an indicator (18) adapted to display a time needed to complete the charging process or a time elapsed since the beginning of the charging process.

10. The motor vehicle according to claim 1, wherein the screen (10) comprises an indicator (17) adapted to display a quantity indicative of a current residual range of the rechargeable power source (3).

11. The motor vehicle according to claim 1, wherein the screen (10) comprises a first touch-sensitive portion defining a first virtual key (19) configured to cause a start of the charging process.

12. The motor vehicle according to claim 1, wherein the second virtual key (20) is further configured such that the charging process is interrupted when pressed by the user even if the charge port (4) is connected to the outer charging source.

13. The motor vehicle according to claim 1, further comprising a control device (11) configured to turn the screen (10) on in response to an arrangement of the door (6) in the opening position.

14. A motor vehicle (1) comprising:
- a rechargeable power source (3),
- a body portion (2),
- a charging compartment (5) on the body portion (2),
- a charge port (4) arranged inside the charging compartment (5) and connected to the rechargeable power source (3),
- a door (6) having a first and a second face (7, 8) opposite one another according to the direction of a thickness of the door (6), the door (6) being coupled to the body portion (2) in a movable manner between a closing position, in which the door (6) closes the charging compartment (5) with the first face (7) facing the charging compartment (5), and an opening position, in which the charging compartment (5) can be accessed from the outside, so that an outer charging source can be connected to the charge port (4) in order to enable a charging process of the rechargeable power source (3), and
- a screen (10) to display one or more items of information relating to the charging process,
- wherein the screen (10) is placed in a position so as to be covered by the door (6) in the closing position;

wherein the screen (10) is arranged on the first face (7) in a manner to be visible when the door (6) is in the opening position; and wherein the door (6) has a third face (7*a*) forming a closed ring around the first face (7), the first face (7) being recessed relative to the third face (7*a*) so as to form a housing for the screen (10), the screen (10) being built-in in the housing so as to entirely cover the first face (7).

* * * * *